358-84. XR 3,056,135 SR

CROSS REFERENCE SEARCH ROOM

Sept. 25, 1962 C. H. CURREY ETAL 3,056,135

METHOD AND APPARATUS FOR AUTOMATICALLY DETERMINING THE LISTENING HABITS OF WAVE SIGNAL RECEIVER USERS

Filed July 9, 1957 4 Sheets-Sheet 1

TX 5027 Rh

INVENTORS
CHARLES H. CURREY and
ROBERT L. FREEMAN
BY
Mason, Kolehmainen, Rathburn and Wyss.
ATTORNEYS INVENTORS
CHARLES H. CURREY and
ROBERT L. FREEMAN
BY Mason, Kolehmainen, Rathburn and Wyss.
ATTORNEYS INVENTORS
CHARLES H. CURREY and
ROBERT L. FREEMAN
BY Mason, Kolehmainen,
Rathburn and Wyss.
ATTORNEYS.

INVENTORS
CHARLES H. CURREY and
ROBERT L. FREEMAN
BY Mason, Kolehmainen, Rathburn and Wyss.
ATTORNEYS.

3,056,135
Patented Sept. 25, 1962

3,056,135

METHOD AND APPARATUS FOR AUTOMATICALLY DETERMINING THE LISTENING HABITS OF WAVE SIGNAL RECEIVER USERS

Charles H. Currey, Palatine, and Robert L. Freeman, Glenview, Ill., assignors to A. O. Nielsen Company, a corporation of Delaware Filed July 9, 1957, Ser. No. 670,713
9 Claims. (Cl. 346—37)

The present invention relates to method and apparatus for automatically determining the listening habits of the users of wave signal receivers and more particularly relates to methods and apparatus for providing a record of the operating conditions of a receiver during a predetermined time interval and a record of either the composition of the audience or the number of persons in the audience of the receiver for each program reproduced by said receiver during said time interval.

The effectiveness of radio or television programs in bringing the sponsors' advertisements before the public may best be determined by ascertaining the listening and viewing habits of the public, and it has long been recognized that this can be best achieved by instrumented methods which monitor the use of radio and television receivers in a relatively small number of statistically selected homes. Such a group of homes may be referred to as a sample, and the assignee of the instant application has, for many years, extensively employed such methods and apparatus to provide a continuous record of the operating conditions of the receivers in such samples. However, in order to make a particularly comprehensive analysis of the drawing power of certain programs, it is desirable to determine the number of persons in the audience of each receiver when it is tuned to receive these programs and in many cases it is desirable to determine the actual composition of the audience during reception of these programs.

There are, of course, numerous non-instrumented methods of determining the effectiveness of certain types of radio and television programs to command large audiences and to draw certain types of persons but these generally require the making of a large number of telephone calls to discover what program a particular receiver is tuned to and what the composition of the audience is at that particular time. Such methods have very great shortcomings, the principal one being that there is no assurance that the wave signal receiver is being used in the manner indicated by the recipient of the call. Consequently, the accuracy of the data which are so accumulated is very poor and the data are thus of little value.

Accordingly, in order to provide accurate data relative to both the number and types of persons in the audience of a receiver during the reception thereby of a particular program, it would be desirable to provide an instrumented method and apparatus for automatically obtaining such data with a minimum of participation by the audience. In a copending Rahmel application, Serial No. 581,209, filed April 27, 1956 now Patent No. 2,924,496, issued February 9, 1960, and assigned to the same assignee as the present application, audience composition data are provided by means of apparatus which requires a limited amount of manual actuation thereof by the receiver users. Because of the ease of operation of the apparatus disclosed in this Rahmel application, relatively accurate and complete results can be obtained. Nevertheless, it would be desirable to provide a method and apparatus which would automatically provide audience composition data.

A principal object of the present invention is, therefore, to provide a new and improved method of providing a record of the number and types of persons using a wave signal receiver.

Another object of the present invention is to provide new and improved apparatus for use in monitoring the use of a wave signal receiver and which automatically provides a record of the number of persons using the receiver.

A further object of the present invention is to provide new and improved apparatus for monitoring the use of a wave signal receiver and which provides a continuous record, with respect to time, of the operating condition of a wave signal receiver and of the composition of the audience of the receiver.

Further objects and advantages of the present invention will become apparent as the following description proceeds and the features of novelty which characterize the invention are pointed out with particularity in the claims annexed to and forming a part of this specification.

For a better understanding of the present invention, reference may be had to the accompanying drawings, in which.

Figure 1:
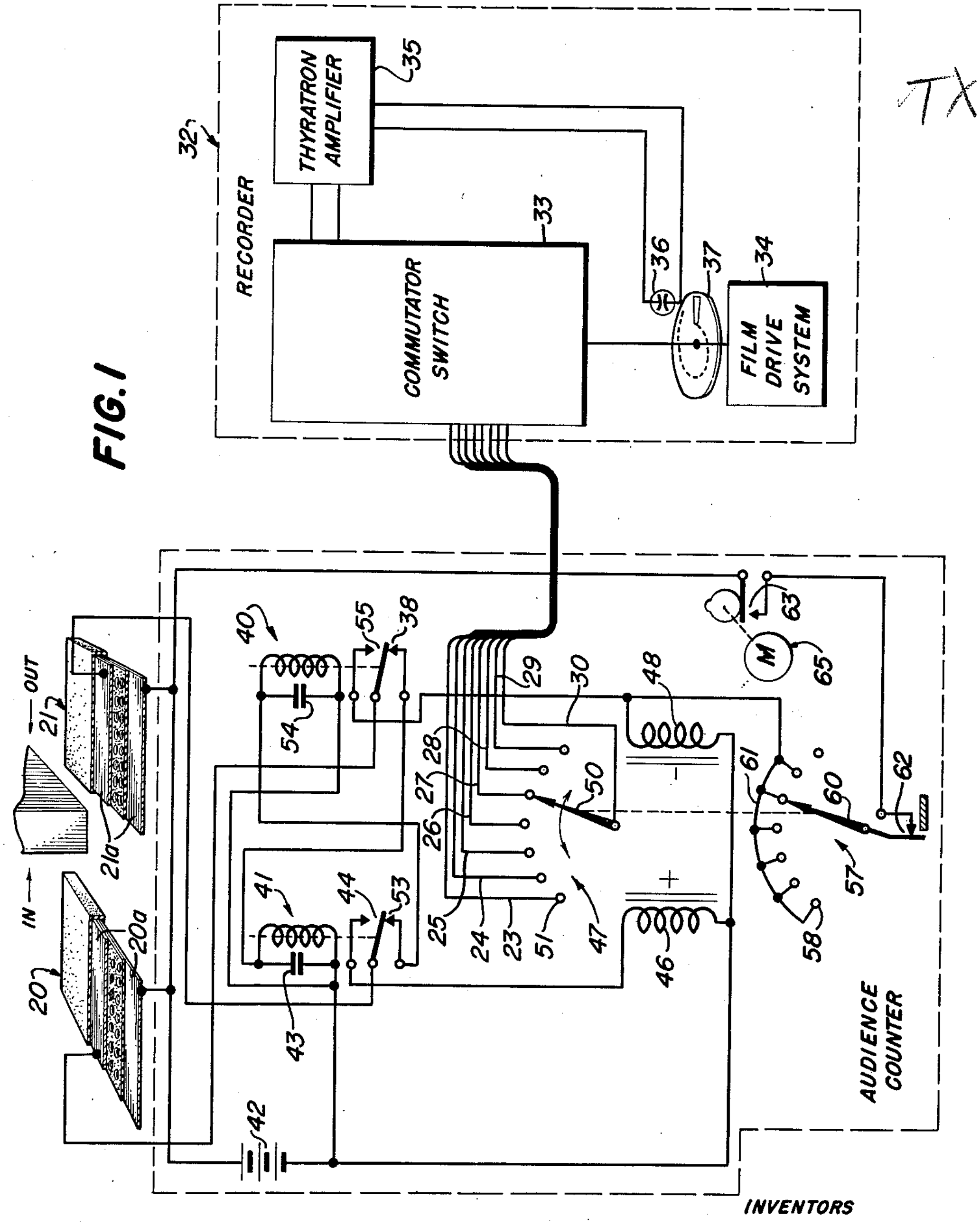
FIG. 1 is a schematic circuit diagram of an electric control circuit for automatically recording the number of persons in a particular area.

Referring now to FIG. 1 of the drawings, there is shown a schematic electric circuit diagram of a device for counting the number of persons entering and leaving a particular area through a doorway in which a pair of switch mats 20 and 21 are mounted on the floor in spaced apart relationship along the normal path of movement through the doorway in such a manner that persons passing through the doorway must necessarily step on both mats, one after the other. These mats are respectively provided with internally mounted switches 20*a* and 21*a* which are each self-biased in an open position and closed whenever a force of at least a predetermined value is exerted on the associated mat. In using the circuit of FIG. 1 to record the number of persons in the viewing area of a television receiver, the switch mats 20 and 21 are positioned preferably on opposite sides of the doorway to that area so that as a person enters the room, in the direction of the arrow designated "in," he first steps on the switch mat 20 and shortly thereafter steps on the switch mat 21. In leaving the room, in the direction of the arrow designated "out," he first steps on the switch mat 21 and thereafter steps on the switch mat 20. If the television viewing area is provided with additional doorways, a similar set of switch mats is provided for each additional doorway and the corresponding switches in each set of mats are connected in parallel. As shown, the switches of the switch mats 20 and 21 are connected in a counting circuit which provides a continuous signal on a plurality of output conductors 23, 24, 25, 26, 27, 28, 29, and 30 of the number of times that the switch mats have been actuated in the "in" sequence, less the number of times that they have been actuated in the "out" sequence. Consequently, the signal on the output conductors 23–30 is indicative of the number of persons in the viewing area at any particular time.

For purposes of illustrating the invention, eight output conductors 23–30 are provided, one of these being a common conductor. Consequently, the circuit of FIG. 1 has a capacity of seven persons, but it will be understood that additional output conductors can readily be provided to handle larger audiences since the number of output conductors is immaterial to the operation of the system.

The conductors 23–30 are connected to a recorder 32 which periodically records, with respect to time, the signal present on the conductors 23–30 to provide a periodic record of the number of persons in the viewing area. The recorder 32 may be of any suitable type, but it is preferably a photographic type recorder of the type disclosed in copending Currey application, Serial No. 381,344, filed September 21, 1953, now Patent No. 2,881,417, and assigned to the same assignee as the present application. Accordingly, a preferred type of recorder 32 includes, among other things, a commutator switch 33, a film drive system 34 including a photographic film, a thyratron amplifier 35, a signal lamp 36, and a shutter disk 37. Although a detailed description of the operation of the recorder 32 may be had by reference to the last mentioned Currey application, very briefly, its operation is as follows: At periodic intervals, such, for example, as once each minute the conductors 23–30 are scanned while the spirally apertured scanning disk 37 rotates in synchronism therewith to position a different one of the apertures between the lamp 36 and the film. Accordingly, as the conductors 23–30 are scanned, a different transverse portion of the film is adapted to be exposed by light from the lamp 36. When the scanning of the conductors 23–30 reaches a conductor on which a signal is present, a signal is supplied to the thyratron 35 which energizes the lamp 36 to expose the area of the film which corresponds to the conductor in question. Since the film is continuously driven, at least during listening or viewing hours, the longitudinal position of the calendar time when the exposure took place and the transverse position of the exposure area is indicative of the number of persons in the viewing area at the time of the exposure.

It should be understood that the recorder 32 preferably includes a suitable mailable magazine into which the film containing the recorded information is gathered. Since the audience composition data are automatically recorded on a single record in a single mailable magazine, no problem of the collaborator making a mistake can arise since he does no more than replace the magazine containing the recorded data from the recorder 32 with a new magazine and mails the used magazine to the survey organization.

Considering the audience counter circuit of FIG. 1, in greater detail, as a person enters the viewing area he first steps on the switch mat 20 thereby closing the switch 20*a* which is serially connected with a set of normally closed contacts 38 of a relay 40 and the control winding of a relay 41 across a suitable source of energization voltage 42. In the illustrated embodiment of the invention, the source 42 is shown as a battery and, preferably, the source 42 provides a direct current voltage because experience has proven that D.C. operated relays are preferable to A.C. operated relays in wave signal receiver monitoring equipment of the type which is located in the home.

Therefore, when the switch mat 20 is stepped on by a person entering the room, a time delay capacitor 43, which is connected in parallel with the winding of the relay 41 is charged up. Therefore, when the person steps off the mat 20 and the switch 20*a* opens, the capacitor 43 discharges through the winding of the relay 41 and maintains the relay 41 in an operative condition throughout a predetermined period. This period should be sufficiently long to insure, under normal operating conditions, that the mat 21 will be stepped on prior to the time that the relay 41 is released, but it should not be so long that a person leaving the room shortly after another person has entered and who steps on the mat 21 would cause an energization of the add coil 46. With the relay 41 maintained operative, the person entering the room next steps on the mat 21 to close the switch 21*a*. The switch 21*a* is serially connected with a set of normally opened contacts 44 of the relay 41 and the add winding 46 of an add and subtract type stepping switch 47 which also includes a subtract winding 48. When, therefore, a person entering a room sequentially actuates the switches 20*a* and 21*a*, the add winding 46 is energized to move the wiper 50 to the succeeding one of a plurality of contact segments 51 which are respectively connected to the conductors 23–29, the wiper 50 being connected to the common conductor 30. When the capacitor 43 has been discharged, thus releasing the relay 41 or when the switch 21*a* opens, the add coil 46 is deenergized. The counting circuit is then ready for the next operation and if another person enters the room he will in turn operate the switches 20*a* and 21*a* in sequence and thus again energize the add coil 46 to step the wiper 50 to the next succeeding one of the segments 51 thereby indicating that two persons are in the room.

In the counting switch 46, the zero contact segment is connected to the conductor 29 and the wiper 50 is moved counterclockwise one contact position each time that the add coil 46 is energized. Accordingly, in FIG. 1 the wiper 50 is positioned to electrically interconnect the conductors 27 and 30 and thus to indicate that two persons are in the viewing area.

Assume that two persons had previously entered the room, the wiper 50 thus being in the illustrated position, and one of them leaves the room. As he walks through the doorway he first closes the switch 21*a* which, as shown, is serially connected with a set of normally closed contacts 53 of the relay 41 and the winding of the relay 40 across the source of voltage 42. Consequently, the relay 40 is operated and a time delay capacitor 54, which is connected in parallel with the winding of the relay 40, is charged up. When the person leaving the room thus steps off the mat 21 and onto the mat 20, he closes the switch 20*a* which is serially connected with a set of normally open contacts 55 in the relay 40 (the contacts 55 are now closed since the relay 40 is operated) and the subtract winding 48 across the source 42. Consequently, the wiper 50 is moved to the segment 51 which is connected to the conductor 28 and thus provides a signal which indicates that there is one person in the room. Shortly after the switches 21*a* are opened, the capacitor 54 completely discharges and the relay 40 is released. The switch 47 thus provides, at all times, an electrical signal on the conductors 23–30 which is indicative of the number of persons who are in a room in which a television or other receiver is disposed.

In order to provide a permanent record, with respect to time, of the number of persons in the viewing area, at periodic intervals, as described hereinbefore, this information is recorded on a film which is included in a mailable magazine and which thus may be transmitted by the collaborator to a survey organization at the same time that the operating condition of the receiver throughout a predetermined period which has been recorded on a film in a similar mailable magazine is mailed to the survey organization. The record which is thus provided in these two magazines enables the survey organization accurately to determine the listening habits of the particular persons in the home from which the magazines are sent.

As a safety measure, once each day, and then at a time when a television or other receiver is unlikely to be in use and no persons are likely to be in the viewing area, means may be provided for resetting the counting switch 47 to zero. The disclosed resetting circuit includes a stepping switch 57 having a plurality of arcuately arranged contact segments 58 and a wiper 60 which is mechanically connected to the wiper 50 so as to move simultaneously therewith. Also, the number of segments 58 is equal to the number of segments 51 and they are respectively disposed in corresponding positions. As shown, all but the one of the segments 58 which corresponds to the zero one of the segments 51 are interconnected by means of a short-circuiting conductor 61 which is also connected to the upper terminal of the subtract winding 48. The switch 57 further includes a set of normally closed contacts 62 which are serially connected with the wiper 60 and a set of normally open switch contacts 63 to the upper terminal of the voltage source 42. The switch 62 is connected to the wiper 60 and is opened while the wiper 60 moves from one contact position to another but is closed when the wiper engages any of the contacts. The switch 62 thus insures a break in the connection between the source 42 and the subtract coil 48 each time that the wipers 50 and 60 move to another segment. This insures a resetting of the switch 47 each time that the timer control switch 63 is closed, this being effected once each day by means of a motor operated camming device 65.

Figure 2:
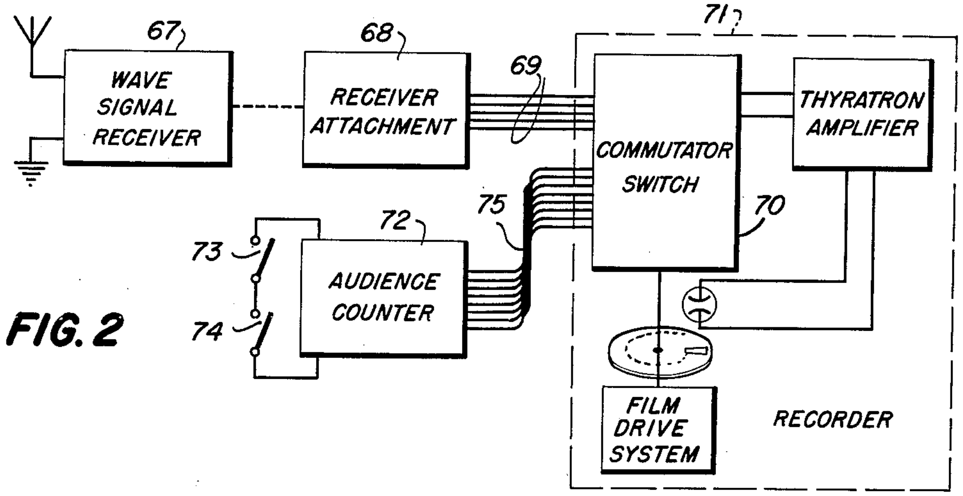
FIG. 2 is a monitoring system, in block diagram form, of apparatus for providing a continuous record of the operating condition of a receiver and of the number of persons in the audience of the receiver.

In the embodiment of the invention, which is illustrated in FIG. 1 of the drawings, a separate recorder 32 is provided for periodically recording the number of persons in the audience. However, the audience composition data may, if desired, be recorded directly on the same film as the operating condition of the associated receiver is recorded. In FIG. 2 there is shown, in block diagram, a system in which a single mailable magazine is utilized in a single recorder for providing a permanent record of both the receiver operation and of the number of persons in the audience throughout a predetermined period.

In the counting circuit of FIG. 1, the switches 20 and 21, which are sequentially operated to provide a count of the number of persons in the room, are provided in door mats but it will be understood that these switches may be associated with any other devices which will cause the sequential operation thereof as the person enters or leaves the room. For example, the switches 20 and 21 may be operated by means of photoelectric devices which are positioned on opposite sides of the doorway opening into the viewing area or they may be controlled by capacitance detecting devices which are similarly placed in the entrance of a viewing area. Although any type of mechanism for causing the sequential operation of the switches 20 and 21 as persons enter or leave the room may be provided, the switch mats appear to be preferable at the present time because they are relatively inexpensive and can be installed with a minimum of effort in a wide variety of locations as is necessary in the monitoring of television receivers in homes.

Referring to FIG. 2, there is shown a wave signal receiver 67 which is connected to a receiver attachment 68 which develops on a plurality of output conductors 69 an electric signal indicative of the instantaneous operating condition of the receiver 67. This signal indicates whether or not the receiver 67 is turned on and, if it is turned on, the station or channel to which it is tuned. The conductors 69 are connected to a commutator switch 70 in a recorder 71 which may be identical to the recorder 32 shown in FIG. 1. The receiver attachment 68 may be of any suitable type such as fully disclosed in the last mentioned copending Currey application, Serial No. 381,344, filed September 21, 1953, and is preferably an attachment, as disclosed in that application, which includes a binary converter so that the output signal on the conductors 69 is of the binary type and thus minimizes the number of separate conductors which must be provided to enable the complete monitoring of a receiver 67 which may be tuned to a large number of stations or channels. The recorder 71 thus provides at periodic intervals on the film in the mailable magazine a record of the operating condition of the receiver 67.

In accordance with the present invention, there is further provided in the system of FIG. 2 an audience counting device 72 of the type illustrated in FIG. 1 and which includes a pair of switches 73 and 74 which are adapted to be operated in sequence by persons entering or leaving the immediate vicinity of the receiver 67. The switches 73 and 74 correspond to the switches 20*a* and 21*a* in FIG. 1 and the output of the audience counter 72 which appears on a plurality of conductors 75, is a signal indicative of the number of persons in the vicinity of the receiver 67. The conductors 75 are connected to suitable input terminals of the commutator switch 70 so that each time that the signal on the conductors 69 is scanned to record the operating condition of the receiver, the signal on the conductors 75 is also scanned to record on the same film the number of people in the audience.

In the device of FIG. 2, therefore, all of the data pertinent to the operating condition of the receiver and to the number of persons in the audience of the receiver are automatically and continuously recorded on a single medium which may be periodically mailed or otherwise transferred to a survey office. If desired, however, the recorder 71 may be replaced by a transmitter which periodically transmits the signals supplied thereto over the conductors 69 and 75 to a central station either by means of radio waves or the like or by telephone lines. In such a system, the recorder is located in a central office remotely disposed from the receiver 67 and a single recorder is used in connection with a plurality of different receivers, all of the homes in the sample being scanned and the information pertinent to the operating condition of the associated receivers and the number of persons in the audience being automatically recorded at the central station. A transmitting system of this type wherein the operating condition of the receiver is automatically and instantaneously transmitted to a central office and which could be modified to include the output signal from the counter 72 is disclosed in copending Rahmel et al. application, Serial No. 572,159, filed March 16, 1956, now Patent No. 2,833,859, and assigned to the same assignee as the present application.

Although the embodiment of the invention illustrated in FIGS. 1 and 2 employs two sequentially operated switches, a single switch can be disposed in the doorway to give an indication of the traffic going into and out of the room, but since such a system provides no way of determining how many persons are in the room at any particular time, the information which is thus provided is of slight value as compared to the more accurate and elaborate data provided by the system employing directional counting.

Figures 3, 4:
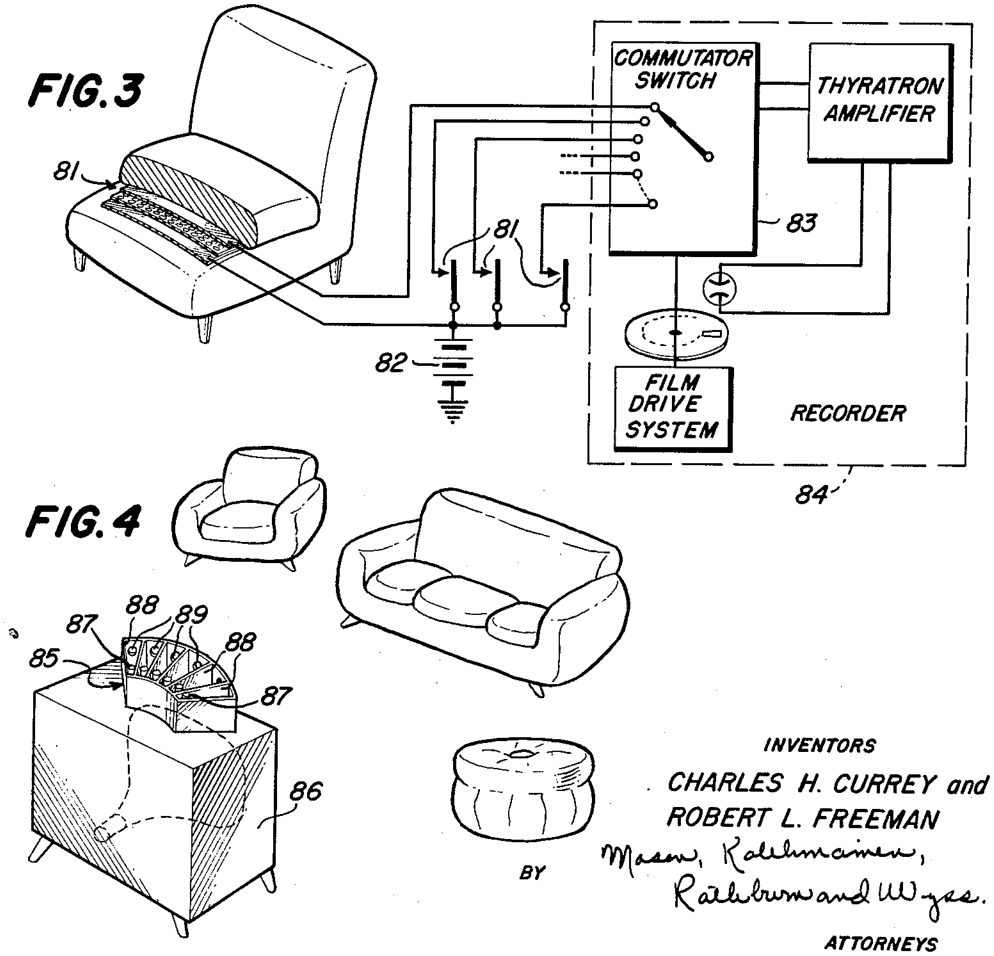
FIG. 3 is a schematic partially diagrammatic view of a modification of apparatus for determining the number of persons in the audience of a wave signal receiver.
FIG. 4 is a pictorial illustration of a television viewing area employing infrared sensitive apparatus for determining the number of persons in the area.

Referring now to FIG. 3, there is shown an audience counting mechanism comprising a plurality of switches 81 which are respectively disposed in or beneath the cushions of chairs in the viewing area and which are each respectively serially connected across a source of energization voltage 82 with a different one of a plurality of segments in a commutator switch 83 of a recorder 84. The recorder 84 is of any suitable type but is preferably like the recorder 32 in FIG. 1. In accordance with this embodiment of the invention, as the wiper of the commutator switch 83 periodically scans each of the input conductors which are respectively connected to the switches 81 in different chairs, a record is made of the number of switches 81 which are closed and, moreover, the particular ones of the switches which are closed. Consequently, there is thus provided a record of the number of persons viewing a television receiver which is disposed in front of the chairs in which the switches 81 are placed. This circuit may be used to provide a record of the audience count on a film in a separate magazine or, where expedient, this circuit may be used to provide, on a single recording medium, a record of the audience count together with the operating condition of the associated receiver, in which case, the switches 81 would replace the audience counter 72 in the system of FIG. 2.

The circuit of FIG. 3 may be used to provide a quality control check in a home in which the collaborator maintains a diary in which he records the types of persons making up the audience for each program and, perhaps, their comments on the relative merits of the programs viewed. If the record which is automatically provided by the system of FIG. 3 does not correspond to the record kept in the diary, the information which is provided in the diary is not used. Therefore, erroneous data are not used to determine various factors relating to the listening habits of wave signal receiver users, and a more accurate set of factors is, therefore, provided.

Referring now to FIG. 4, there is shown an electromagnetic wave sensing system for counting the number of persons viewing a television receiver. This system comprises an electromagnetic sensing device 85 which is preferably mounted either directly above or directly below the vertical center line of the television receiver 86 and comprises a plurality of arcuately disposed electromagnetic wave sensing elements 87 which are respectively positioned between a plurality of partitions 88 in the housing of the unit 85. A plurality of apertures 89 are provided in the unit 85 between the partitions so as to limit the electromagnetic waves which impinge on the respective ones of the sensing elements 87 to those emanating from a particular direction. The individual sensing devices 87 are so positioned with respect to their associated apertures 89 as to be sensitive to the radiation emanating from particular locations in the room which would normally be occupied by persons viewing the receiver. Since television screens are ordinarily best viewed from within an angle of 90 degrees, the sensitive devices 87 need only be sensitive to radiation from a relatively small area within the room and are best provided in proximity to the receiver so as to be sensitive only to persons within the area from which the screen of the receiver can be conveniently viewed. In the room illustrated, there is provided a plurality of easy chairs. In this arrangement the first and most left of the elements 87, as viewed in FIG. 4, is responsive to radiation from the vicinity of the chair positioned to the most left. The next three sensing elements are respectively sensitive to radiation from each of the cushions from the sofa and the last and most right of the sensing elements 87 as viewed in FIG. 4 is sensitive to radiation from the most right seat. Although the room could be periodically illuminated so that light reflected from the persons occupying the chairs could be used to so effect the sensing elements 87 as to provide a suitable signal for recording purposes, preferably the elements 87 are infrared sensitive and no artificial illumination is employed. In this manner the persons in the room may be better distinguished from other objects since persons necessarily give off a certain amount of infrared radiation whereas radiation from other objects is relatively constant and may be accounted for separately. Moreover, because of the directional sensitivity of the elements 87 such things as radiators and the like in the room may be effectively blocked out so that no indication thereof is provided by the device. Since infrared sensitive circuits are well known, the electrical circuit in which the sensitive elements 87 are connected is not shown. It will be understood that any suitable recording circuit may be used.

Instead of using infrared sensitive apparatus it will be understood that ultrasonic apparatus may be employed in a similar manner.

In the embodiments of the invention as illustrated in FIGS. 1 to 4 and described above, no provision is made for distinguishing between the different types of persons that make up the audience. Since, however, certain programs are directed to certain types of persons and the products which are thus advertised are primarily ones which are used by that type of person, it is desirable to determine the effectiveness of the particular program in reaching that type of person. For example, certain programs are primarily directed to children, others to female adults, and still others to male adults. Accordingly, it would be particularly desirable to provide apparatus for use in determining the listening habits of wave signal receiver users which not only provides the number of persons using the receiver at any particular time but also provides a record of the types of persons using the receiver at any particular time. In the heretofore mentioned copending Rahmel application, such an apparatus is provided wherein the user periodically operates pushbuttons or the like to provide a record of the types of persons making up the audience. However, it would be desirable if such information could be automatically recorded without the participation of the collaborator. This would insure more accurate results and make it more convenient for a collaborator to have such apparatus in his home.

Figure 5:
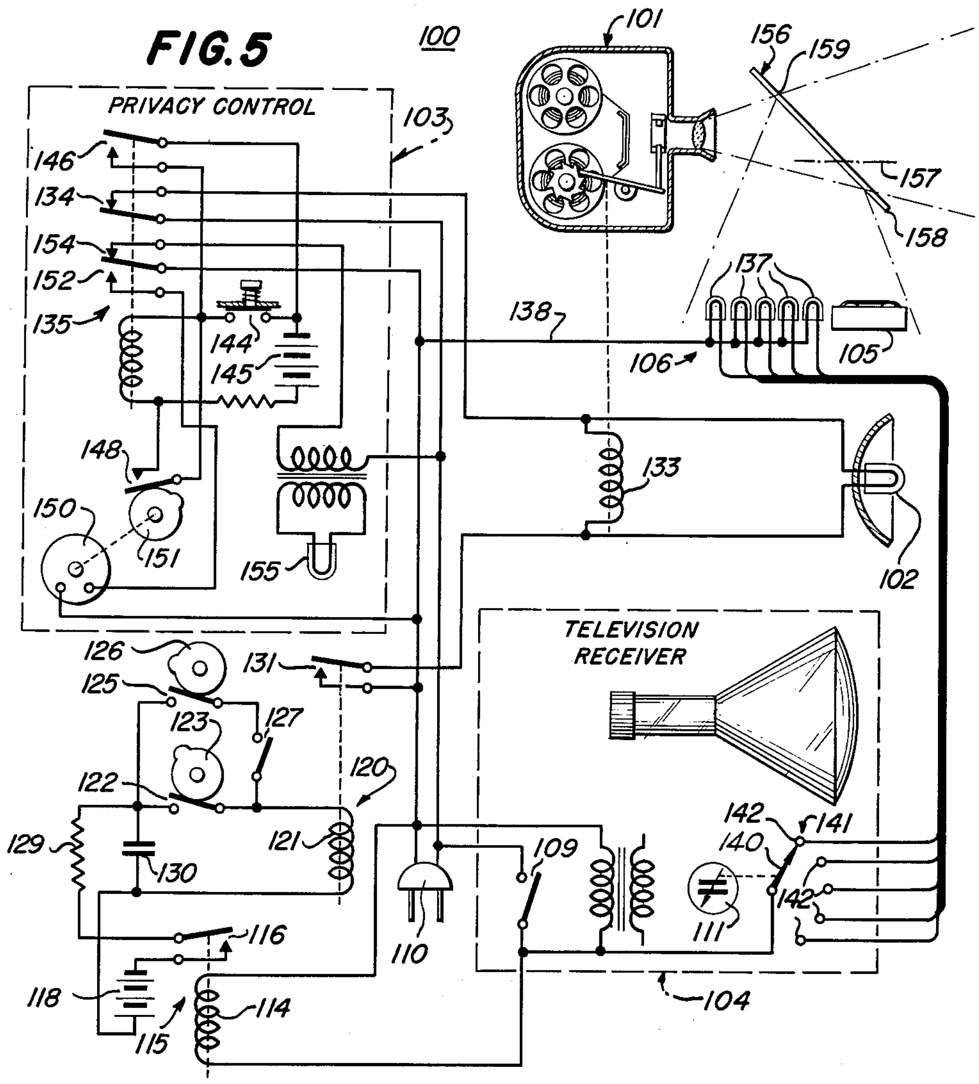
FIG. 5 is a schematic view of photographic apparatus for determining the audience composition of a wave signal receiver such as a television receiver.

Referring now to FIG. 5, there is shown a fully automatic audience composition detector 100 which provides a photographic record of the audience composition of a television receiver. Very briefly, and before considering the circuitry of FIG. 5 in detail, the detector 100 comprises as its principal components a camera 101, a source of illumination 102, and a privacy control unit 103, the camera 101 and the source of illumination 102 being mounted in proximity to a monitored television receiver 104 and directed toward the viewing area thereof. Periodically, during use of the receiver 104, the photographic film in the camera 101 is exposed with an image of the viewing area, thus providing a photograph of the audience each time that an exposure is made. In order to correlate, with respect to time, each exposure that is made by the camera 101, means providing a visible indication of the calendar time, such, for example, as the clock 105, is disposed within the exposure angle of the camera 101. Where desired, a channel indicator 106 may also be positioned within the exposure angle of the camera 101 so as to provide in conjunction with the clock 105, data from which may be determined the particular program being viewed each time that a photograph of the audience is made.

Considering now the detector 100 in greater detail, the television receiver 104 includes an on-off switch 109 for controlling the energization of the receiver 104 from a suitable source of voltage connected to a conventional plug-in type electrical connector 110. A tuner 111, shown schematically, is also provided in the receiver 104 for selectively tuning the receiver to reproduce the program whose signal is provided in one of a plurality of channels containing signals reproducible by the receiver 104. When the receiver 104 is energized by virtue of the switch 109 being closed, the winding 114 of a power control relay 115 which is serially connected with the switch 109 across the output conductors of the connector 110 is energized to operate the relay 115 and thus to close a set of normally open contacts 116 thereof. The contacts 116 are serially connected with a suitable source of direct current voltage 118 to condition a relay 120 for operation whenever a switch 122 is closed. The relay 120 has a winding 121 which is serially connected across the source 118 with the set of relay contacts 116, a resistor 129, and a capacitor 130. Therefore, when contacts 116 are closed, the capacitor 130 is charged through the resistor 129. The switch 122 is periodically closed by a cam 123 to momentarily operate the relay 120 by connecting the charged capacitor 130 across the winding 121. Preferably, the cam 123 is driven by a suitable A.C. operated motor (not shown) which may be connected in series with the switch 109 across the output conductors of the connector 110. The cam 123 may be driven at a speed of, for example, one revolution each five minutes so that once each five minutes the relay 120 is operated if the television receiver 104 is being used. In the event that it is desired to alter the frequency at which a photograph is made of the viewing area, another cam operated switch 125, which is periodically closed by a cam 126, may be serially connected with a simple on-off switch 127 in parallel with the switch 122. The cam 126 is rotated at a speed exceeding that of the cam 123 and preferably the cam 123 is driven at a speed which is an even multiple of that of the cam 126. Consequently, when the switch 127 is closed, the relay 123 is operated more frequently than when the switch 127 is opened. If desired, and preferably, the cams 123 and 126 may be operated by means of the same motor, their being connected to a different point in an output speed reduction unit of the motor.

In order to expose the film in the camera 101 with the image of the audience, the image of the clock 105 and the image of the channel indicator 106 each time that the relay 120 is operated, the source of illumination 102 is connected in parallel with a solenoid 133 which operates the shutter and the film advance mechanism of the camera 101. It will be apparent that the camera 101 is similar to a movie type camera in that a single member actuates the shutter and advances the film. The parallel connection of the source of illumination 102 and the solenoid 133 is serially connected across the output conductors of the connector 110 with the contacts 131 and a set of normally closed contacts 134 of a relay 135 in the privacy control unit 103. If, therefore, the relay 135 is released when the contacts 131 close, the source of illumination 102 is energized to irradiate the viewing area of the television receiver 104 and the shutter of the camera 101 is operated to make an exposure of the viewing area on an unexposed portion of the film, which unexposed portion of film is moved into the exposure area of the camera when the solenoid 133 is energized prior to the time that the shutter is actuated. The clock 105, which provides on the face thereof a visible indication of the calendar time, is preferably of the electrically powered type which includes a spring motor for causing accurate operation of the clock throughout extended periods of power outages. Consequently, when the photographs of the audience are made, which photographs include the face of the clock 105, the time indicated on the film is accurate irrespective of previous power outages.

In order to record on the film of the camera 101 an indication of the channel to which the receiver 104 is tuned at the time that each exposure of the audience is made, the channel indicator 106 is provided with a plurality of lamps 137 which are selectively energized so as to indicate the channel to which the receiver 104 is tuned. In the illustrated embodiment of the invention, the lamps 137 each have one terminal thereof connected to a common conductor 138 which is connected to one of the output conductors of the connector 110, the other output conductor of the connector 110 being connected through the switch 109 to a wiper 140 of a selector switch 141. The selector switch 141 is provided with a plurality of arcuately arranged contacts 142 which are respectively connected to the other sides of the lamps 137 so that the position of the wiper 140 is indicated on the face of the unit 106 by the particular one of the lamps 137 which is illuminated. As shown, the wiper 140 is mechanically connected to the tuner 111 and follows the angular position of the tuning shaft of the receiver 104, whereby the one of the lamps 137 which is energized is indicative of the tuning condition of the television receiver.

Inasmuch as photographs are periodically taken of the viewing area of the television receiver 104 while the receiver 104 is energized, it is possible that at certain times the audience would prefer not to be photographed. Therefore, the privacy control unit 103 and particularly the set of normally closed contacts 134 thereof is connected in the energization circuit of the solenoid 133 and of the source of illumination 102. When a person desires to have a certain degree of privacy while he views the television receiver 104, he momentarily actuates a switch 144 which is normally biased in an open position and which when closed connects a source of voltage 145 across the winding of the relay 135. When, therefore, the switch 144 is closed, the relay 135 is operated to open the normally closed contacts 134 and thereby to prevent energization of the solenoid 133 and thus to prevent the operation of the camera 101 to take a photograph of the audience. The relay 135 is provided with a set of normally open holding contacts 146 which are connected in parallel with the switch 144 so that once the relay 135 is operated the winding thereof is maintained energized through the holding contacts 146.

In order to return the audience composition detector system to operation when the privacy of the audience is no longer necessary, a normally open cam operated switch 148 is connected directly in parallel with the winding of the relay 135 and a one-half revolution per hour motor 150 drives a cam 151 which closes the switch 148 once during each complete revolution of the cam 151. The motor 150 is serially connected with a set of normally opened contacts 152 of the relay 135 across the output conductors of the connector 110 so that when the privacy control switch 144 is initially closed to operate the relay 135, the motor 150 is set into operation and thirty minutes thereafter it closes the switch 148 which releases the relay 135 thereby to return the audience composition detector system to operation.

For the purpose of advising the audience of the fact that the system is in operation and that photographic exposures will be periodically made, the relay 135 is provided with a set of normally closed contacts 154 which are serially connected in the energization circuit of an indicator lamp 155 which is thus energized whenever the relay 135 is released and the system is adapted to take photographs of the audience. The use of a privacy control unit which automatically returns the system to an operative condition after a predetermined time interval is believed to be preferable to one in which a collaborator must return the system to operation since the collaborator may very likely forget to return the system to an operative condition even after he no longer needs the privacy previously desired. Also, it is believed that the provision of a half-hour of privacy for each actuation of the switch 144 is sufficient although, of course, shorter or longer intervals of privacy could be provided by varying the speed of the motor 150.

In order to record on a single film in the camera 101 both the audience composition and the time at which the exposure of the audience is made, there is provided, in accordance with another aspect of the present invention, a half-silvered mirror 156 which is positioned between the lens of the camera 101 and the viewing area and disposed in a plane which intercepts the principal axis of the lens system at a forty-five degree angle. Below the dash-dot line 157 is the mirrored portion, designated 158, and above the line 157 is the transparent portion, designated 159. The clock 105 and the channel indicator 106 are positioned beneath the half mirror 156 so that the image of these devices is reflected from the mirror surface 158 onto the film in the camera 101 and the image of the audience is transmitted through the transparent portion 159 onto a different portion of the film. Preferably, that portion of the film on which the images of the clock 105 and the channel indicator 106 are focused is that portion which would ordinarily be occupied by the image of the floor of the viewing area. Consequently, with this arrangement, a photograph of the clock 105 and the channel indicator 106 may be made simultaneously with an exposure of the viewing area without any loss of pertinent audience composition information.

Figure 6:
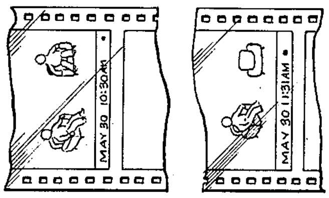
FIG. 6 is a view of a segment of a record receiving medium showing the recording obtained thereon by the apparatus of FIG. 5.

Referring to FIG. 6, there is shown a portion of a film which has been exposed in the system of FIG. 5 and thereafter developed. It may be seen that in each frame, the calendar time and the receiver operating condition appear directly below the picture of the viewing area of the associated receiver. Whether or not the receiver operating condition information is provided on the audience composition detector film, a receiver operating condition recorder such as disclosed in Rahmel patent 2,755,163, assigned to the same assignee as the instant application, may also be connected to the receiver 104 since the data provided by such systems are more readily transcribed than the similar data provided by the present system.

Figure 7:
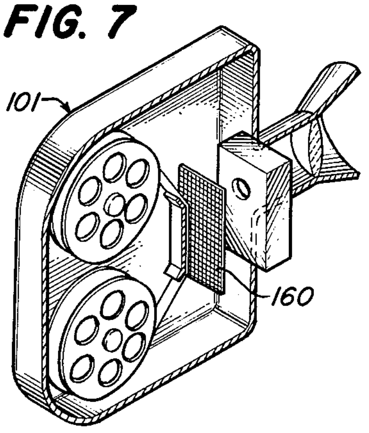
FIG. 7 is a somewhat schematic cross sectional view of the camera usable in the apparatus of FIG. 5 and which includes means for providing a degree of privacy to the audience.

It will be appreciated that many persons are often in a relaxed state while viewing television receivers and, therefore, may not be clothed, etc. in a manner in which they would desire to be photographed. In order to respect their privacy and at the same time obtain information indicative of the audience composition of the television receiver, a diffusion screen may be included in the optical system of the camera 101 so as to blur the image of the audience by a controlled amount thereby permitting identification of the individuals in so far as audience composition is concerned but not to a degree to provide any detail of costume or the like. This may be accomplished by defocusing the camera 101 so that the film is disposed a short distance from the image point. Similarly, and as shown in FIG. 7, a diffusion screen 160 may be interposed between the lens of the camera 101 and the film. If a clock 105 having numbers appearing on the face thereof is employed, the disadvantage of the defocusing method as well as that of placing a diffusion screen between the lens and the film is apparent and some difficulty will arise in the translating of the calendar time information from the photographs. This disadvantage can be obviated by using a diffusing member in the portion 159 of mirror 156 of FIG. 5 while permitting the portion 158 to be a good reflecting surface.

Figure 8:
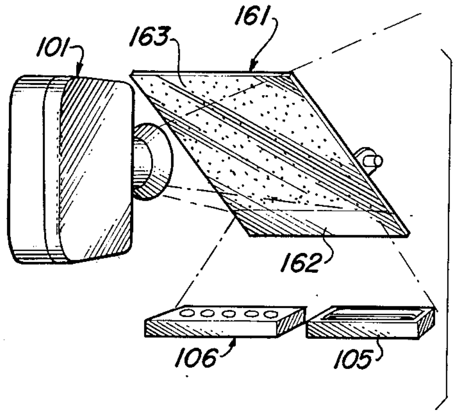
FIG. 8 is a schematic cross sectional view of an alternative optical system used in the apparatus of FIG. 5.

Referring to FIG. 8, there is shown a system wherein the photograph of the audience is somewhat blurred but the photographs of the channel indicator 106 and of the clock 105 are perfectly clear. In this arrangement a half-mirror 161 having a partial mirror surface 162 and a partial translucent surface 163 is provided between the lens of the camera 101 and the audience. The portion 163 may be a frosted glass or the like while the mirror 163 will be a clear mirror. Accordingly, the image of the audience which is reproduced on the camera 101 is blurred whereas the image of the clock 105 and the channel indicator 106 which is reproduced on the film is clear. Consequently, translation of the information from the film is facilitated.

Figure 9:
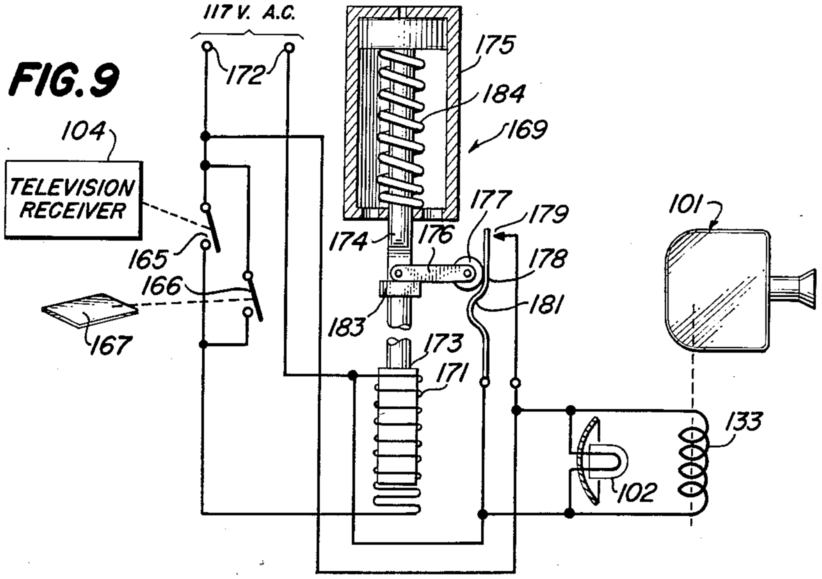
FIG. 9 is a schematic circuit diagram of an electric control circuit of another modification for providing a record of the audience composition receiver.

Referring to FIG. 9, there is shown an audience composition detector device in which a photograph of the audience is made each time that a change in the audience occurs and each time that the operating condition of the receiver is changed. In this circuit an on-off type switch 165 is connected in parallel with an on-off switch 166, the switch 165 being connected to the television receiver 104 so that each time that the operating condition of the receiver 104 is changed the switch 165 is momentarily closed and the switch 166 is connected in a switch mat 167 which is disposed in the doorway to the viewing area so that each time that a person enters or leaves the viewing area, the switch 167 is closed. In order to insure that the photograph of the audience is taken after, for example, the person entering the room and actuating the switch 167 has reached the viewing area, or after the person making the change in the operating condition of the receiver has returned to the viewing area, a time delay mechanism 169 is provided.

Considering now the operation of the circuit of FIG. 9, it will be understood that when, for example, a person enters the room, he steps on the mat 167 and thereby closes the switch 166. This switch is serially connected with a solenoid 171 across a suitable source of voltage which in turn is connected across a pair of input power terminals 172. Accordingly, the solenoid 171 is energized and moves an associated core 173 downwardly. The core 173 is connected through a connecting rod 174 to a conventional dash-pot 175 which slowly returns the core 173 and the rod 174 to the illustrated position after the solenoid 171 has been deenergized. Pivotally mounted on the arm 174 is a switch actuating arm 176 having a roller or wheel 177 on the end thereof. The roller 177 rides along the surface of a switch contact member 178 selectively to cause the member 178 to move against a fixed contact 179 and thereby connect the solenoid 133 and the source of electromagnetic radiation 102 across the source of voltage connected to the terminals 172. The switch 178 is provided with a reversely bent intermediate portion 181 and the contact member 178 is sufficiently rigid so that as the core 173 moves downwardly into the winding of the solenoid 171 and the roller 177 rides over the hump at the contact portion 181, the switch actuating arm 176 pivots counterclockwise on the connecting rod 174. When the roller 177 rides below the reversely bent portion 181, the arm 176 rotates clockwise due to force of gravity and returns to the position illustrated, resting on a collar 183 which is fixedly positioned on the connecting rod 174. A spring 184 connected between the piston and cylinder exerts an upward force on the rod 174 and a predetermined time after the person has stepped off the mat 177 and thereby deenergized the solenoid 171, the wheel 177 rides up the hump of the intermediate contact portion 181 which because of the fixedly positioned collar 183 does not pivot against the rod 174 but presses the contact 181 into engagement with the contact 179, thereby to take a photograph of the audience. The system operates in a similar manner when the switch 165 is closed during a change in the operating condition of the receiver 104.

If the camera 101 used in the system of FIG. 9 has a shutter mechanism such that the solenoid 133 should be operated only momentarily, then a capacitor charging circuit such as that provided in the circuit of FIG. 5 for momentarily energizing the winding 121 of the relay 120 when the contacts 116 are closed may be provided for energizing the lamp 102 and the solenoid 133.

In the system of FIG. 9, as contrasted with that of FIG. 5, photographs of the audience are taken only when a change therein occurs or when a change in the operating condition of the receiver occurs. Accordingly, the number of photographs which are taken and the quantity of film used in the system of FIG. 9 is appreciably less than that used in the system of FIG. 5. In both the circuits of FIGS. 5 and 9, the use of an artificial source of illumination, namely, the source 102 is provided but it will be understood that where infrared film or the like which is sufficiently sensitive to radiation from the human body to be properly exposed is employed, then the source of radiation may be eliminated.

Although the source 102 may provide visible light and ordinary film which is sensitive to electromagnetic radiation in the visible light region may be provided, in order to better respect the privacy of the audience, it is preferable that invisible electromagnetic radiation be employed for taking such photographs, such as infrared radiation and infrared sensitive film.

Figure 10:
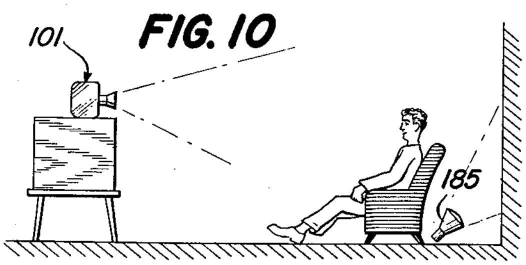
FIG. 10 is a pictorial view of photographic apparatus for recording audience composition of a television receiver.

Referring to FIG. 10, there is illustrated an alternative arrangement for obtaining audience composition data by means of photographs in which the individuals involved cannot be readily identified. Accordingly, in FIG. 10 a silhouette of the audience is provided by employing a source of illumination 185 which may be a lamp whose light is directed on the wall immediately behind the viewing area. With this arrangement, the details of the area and audience are omitted from the photograph. Although the information so obtained would not be as useful as that obtained by complete detailed photographs, the information would be appreciably better than no information at all in regard to the audience composition.

Figure 11:
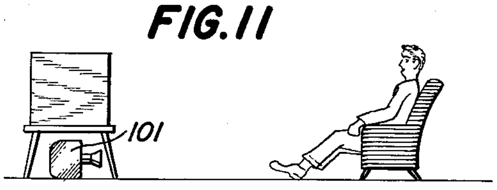
FIG. 11 is another photographic apparatus for providing a continuous record of the audience composition of a television receiver.

Similarly, in FIG. 11 there is shown another arrangement wherein the camera 101 is disposed near the floor and the exposure angle therein is restricted so that only a photograph of a portion of the room beneath, for example, the cushion to the chair is made. Consequently, only the lower extremities of the bodies of those in the audience are photographed, namely, the feet and legs. In such photographs a distinction can be made between the number of adults and the number of children but it is appreciated that where more detailed information which distinguishes between adult males and adult females is desired, such a method would be unsatisfactory.

Other arrangements which may be used to determine audience composition are, for example, the positioning of a mat or the like in the doorway and a camera focused on the doorway so that each time a person enters or leaves the viewing area and steps on the mat or other sensitive device causes a photograph of the doorway to be made. From these photographs it can be determined how many persons and what types of persons are in the viewing area. Similarly, a source of ultrasonic vibrations may be provided in the viewing area, and a doppler type sonic receiver may be used to detect movement, thereby providing an indication of the traffic in the viewing area.

While particular embodiments of the invention have been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. Apparatus for monitoring the use of a wave signal receiver by simultaneously producing a record of the tuning condition of the receiver and the composition of the audience of the receiver which comprises photographic recording means for photographing the audience of said receiver, means disposed in a passageway leading to the location of the monitored receiver for actuating said photographic recording means for causing a photograph to be taken whenever a person passes through said passageway, and a second means for actuating said photographic recording means whenever the tuning condition of said receiver is changed.

2. The apparatus of claim 2 wherein said recording means, whenever actuated, also records the time when actuated.

3. In apparatus for determining the listening habits of the users of a television receiver by recording on a single record receiving element the tuning condition of the receiver with respect to time and the composition of the audience viewing the receiver with respect to time, the combination of camera means including a lens for effecting a record of the tuning condition of the receiver and a photograph of the viewing area of a television receiver on a discrete portion of a length of film, a partially transparent, partially opaque member interposed between the lens of said camera and said viewing area, the transparent portion of said member being frosted or the like so as to prevent the transmission therethrough of a clear image of said viewing area, the opaque portion of said member including a mirror surface, and a clock having a time-of-day indicating portion so disposed that the image thereof is reflected by said mirror surface through said lens system thereby to appear as a clear image on said discrete portion of the film together with an indistinct image of said viewing area.

4. Apparatus for use in monitoring the operation of a television receiver, comprising camera means for producing a photographic record of time, the tuning condition of said receiver, and the viewing area of said receiver on a discrete portion of a length of film, means for conditioning said camera means for automatically producing said photographs in response to signals supplied thereto, manually operable means for rendering said conditioning means inoperative for a predetermined time interval and timing means placed in operation by said manually operable means for automatically rendering said conditioning means operative after the termination of said predetermined time interval.

5. In apparatus for monitoring the use of a television receiver including a control switch, the combination of camera means including a movable film, first control means connected to said receiver for displaying the tuning condition of said receiver, second control means for causing said camera means to record on said movable film photographic reproductions of said displayed tuning condition and the viewing area in front of said receiver, and means controlled by said control switch for placing said second control means in operation.

6. The apparatus of claim 5 including an optical system for said camera means having a first portion for supplying said camera means with a blurred image of said area and a second portion for supplying said camera means with a clear image of the displayed tuning condition.

7. The combination set forth in claim 5 wherein said movable film is sensitive to invisible electromagnetic radiation, and said combination includes a source of said invisible radiations for irradiating said area.

8. An apparatus for use with a device for recording the tuning condition of a wave signal receiver and simultaneously recording the composition of the audience of said receiver, comprising camera means for receiving an image of the viewing area of said receiver, control means connected to said camera means for operating said camera means to provide a photographic record of said viewing area, and first means operated in response to a change in the tuning condition of said receiver for actuating said control means.

9. The apparatus set forth in claim 8 including second means responsive to movement of a viewer for actuating said control means.

References Cited in the file of this patent

UNITED STATES PATENTS

| | | |
|---|---|---|
| 1,105,484 | Cannon | July 28, 1914 |
| 2,083,264 | Hymans | June 8, 1937 |
| 2,086,087 | Melton | July 6, 1937 |
| 2,289,750 | Branham | July 14, 1942 |
| 2,332,154 | Lindsay et al. | Oct. 19, 1943 |
| 2,336,076 | Durham et al. | Dec. 7, 1943 |
| 2,409,358 | Kaplan | Oct. 15, 1946 |
| 2,488,868 | Kaplan | Nov. 22, 1949 |
| 2,573,350 | Miller | Oct. 30, 1951 |
| 2,683,071 | Pearle | July 6, 1954 |
| 2,704,784 | Hammond | Mar. 22, 1955 |
| 2,709,636 | Owens | May 31, 1955 |
| 2,736,630 | Cooper | Feb. 28 1956 |
| 2,751,275 | Mansberg | June 19, 1956 |
| 2,924,496 | Rahmel | Feb. 9, 1960 |

FOREIGN PATENTS

| | | |
|---|---|---|
| 464,597 | Great Britain | Apr. 22, 1937 |

UNITED STATES PATENT OFFICE

CERTIFICATE OF CORRECTION

Patent No. 3,056,135 September 25, 1962.

Charles H. Currey et al.

It is hereby certified that error appears in the above numbered patent requiring correction and that the said Letters Patent should read as corrected below.

In the grant, lines 2 and 3, and 12, and in the heading to the printed specification, line 6, name of assignee, for "A. O. Nielsen Company", each occurrence, read -- A. C. Nielsen Company --; column 13, line 58, for the claim reference numeral "2" read -- 1 --.

Signed and sealed this 19th day of March 1963.

(SEAL)
Attest:

ESTON G. JOHNSON
Attesting Officer

DAVID L. LADD
Commissioner of Patents